United States Patent [19]

Hamilton et al.

[11] Patent Number: 5,015,273

[45] Date of Patent: May 14, 1991

[54] FOAM BREAKER AND METHOD

[75] Inventors: Billy E. Hamilton, Marrero; Brian K. Moore, Lafayette, both of La.; Donald E. Newton, Houston, Tex.

[73] Assignee: Camco International Inc., Houston, Tex.

[21] Appl. No.: 494,704

[22] Filed: Mar. 16, 1990

[51] Int. Cl.[5] ............................................. B01D 19/04
[52] U.S. Cl. ........................................ 55/53; 55/52; 55/178; 55/196
[58] Field of Search ................ 55/37, 45, 52, 53, 178, 55/196

[56] References Cited

U.S. PATENT DOCUMENTS

| | | | |
|---|---|---|---|
| 1,449,114 | 3/1923 | Hayduck | 55/178 |
| 2,813,833 | 11/1957 | Revallier | 55/53 |
| 3,070,935 | 1/1963 | DeLeon | 55/196 X |
| 3,358,425 | 12/1967 | Burnham, Sr. | 55/52 X |
| 4,100,071 | 7/1978 | Beurer et al. | 55/178 X |
| 4,120,816 | 10/1978 | deLautrec et al. | 55/178 |
| 4,415,341 | 11/1983 | Echtler | 55/196 X |
| 4,861,352 | 8/1989 | Cheng | 55/196 X |

FOREIGN PATENT DOCUMENTS

| | | | |
|---|---|---|---|
| 637529 | 3/1962 | Canada | 55/178 |
| 2570286 | 3/1986 | France | 55/53 |
| 912206 | 3/1982 | U.S.S.R. | 55/178 |
| 1289528 | 2/1987 | U.S.S.R. | 55/178 |
| 1274195 | 5/1972 | United Kingdom | 55/52 |
| 2202167 | 9/1988 | United Kingdom | 55/53 |

Primary Examiner—Robert Spitzer
Attorney, Agent, or Firm—Fulbright & Jaworski

[57] ABSTRACT

An apparatus and method for breaking up a mixture of gas and liquid forming a foam returning from an oil and/or gas well. The foam breaker includes a housing having a bore for receiving the foam and a restriction in the bore for compressing the foam. A plurality of jets in the restriction are directed into the bore for saturating the foam for breaking up the mixture. The recovered liquid may be filtered and reused.

12 Claims, 2 Drawing Sheets

FOAM BREAKER AND METHOD

BACKGROUND OF THE INVENTION

It is well known to use foam, a mixture of gas and liquid, in oil and/or gas wells for performing various procedures such as foam fracturing, foam acidizing and foam washing for removing solids, such as sand, scale, etc., from wells.

While performing a procedure that requires a stable foam to be circulated into and out of an oil and/or gas well bore over a long period of time, containing the foam returns at the well surface becomes a problem in the limited tank space that it usually available. The returning foam will occupy about five times as much space as the fluid that is being removed from the tank to produce the foam. However, the foam remains stable with a gas content up to 90 percent and requires a long period of time to dissipate back to the volume of the original liquid. In many locations, such as in offshore rigs, there is not sufficient tank capacity to accommodate the increased volume of foam. This can cause tank overflow and result in pollution.

The present invention is directed to an improved apparatus and method of breaking up or causing disintegration of the cells that form the foam body.

SUMMARY

One feature of the present invention is the provision of an apparatus for breaking up a mixture of gas and liquid forming a foam by providing a housing having a bore for receiving the foam. A restriction is provided in the bore for compressing the foam as it flows into the restriction. A plurality of jets are provided in the restriction and are directed into the bore and a fluid conducting means is connected to each of the jets and extends to the outside of the housing for receiving fluid for breaking up foam flowing through the bore. Preferably the jets are positioned around the inner periphery of the restriction and adjacent the downstream end of the restriction. And preferably the fluid conducting means includes a circumferentially extending chamber in the housing.

Still a further object is wherein the housing includes an inlet and an outlet. A gas separator having a wall is connected to the outlet of the housing. The longitudinal axis of the housing is directed at an angle to the wall for assisting the break up of the foam as the fluid from the housing impinges on the wall.

Yet a still further object of the present invention is the provision of a method of breaking up a flowing mixture of gas and liquid forming a foam returning from an oil and/or gas well which includes compressing the foam mixture, saturating the compressed foam mixture with a fluid sufficiently to cause instability and break up of the mixture, and expanding the saturated foam mixture. Preferably the fluid is an inert gas such as nitrogen. However, the fluid may be water or a stability reducing chemical such as an inorganic salt.

Yet a still further object of the present invention is the improvement in a foam washing system for removing sand from the well bore of an oil and/or gas well having a fluid mixture tank, a fluid pump, a nitrogen supply, an atomizing tee, and a coiled tubing extending into the well bore for inserting foam into the well bore. The improvement includes a foam breaker connected to the well bore for receiving returning foam. The foam breaker includes a housing having a bore for receiving foam, a restriction in the bore for compressing the foam, a plurality of jets in the restriction and directed into the bore. A gas supply is connected to the jets for saturating the foam in the restriction and a gas separator is connected to the outlet of the foam breaker for receiving the broken up foam. A return tank is connected to the separator for receiving the liquids. The apparatus may further include a filter connected to the return tank and a line between the filter and the fluid mixing tank for reusing the liquid from the return tank.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

While the present invention is useful for breaking up the foam returning from an oil and/or gas well when performing various foam procedures such as foam fracturing and foam acidizing, the present invention will be illustrated, for example only, as used in a method of foam washing in an oil and/or gas well bore for removing solids such as sand from the well bore.

Figure 1:
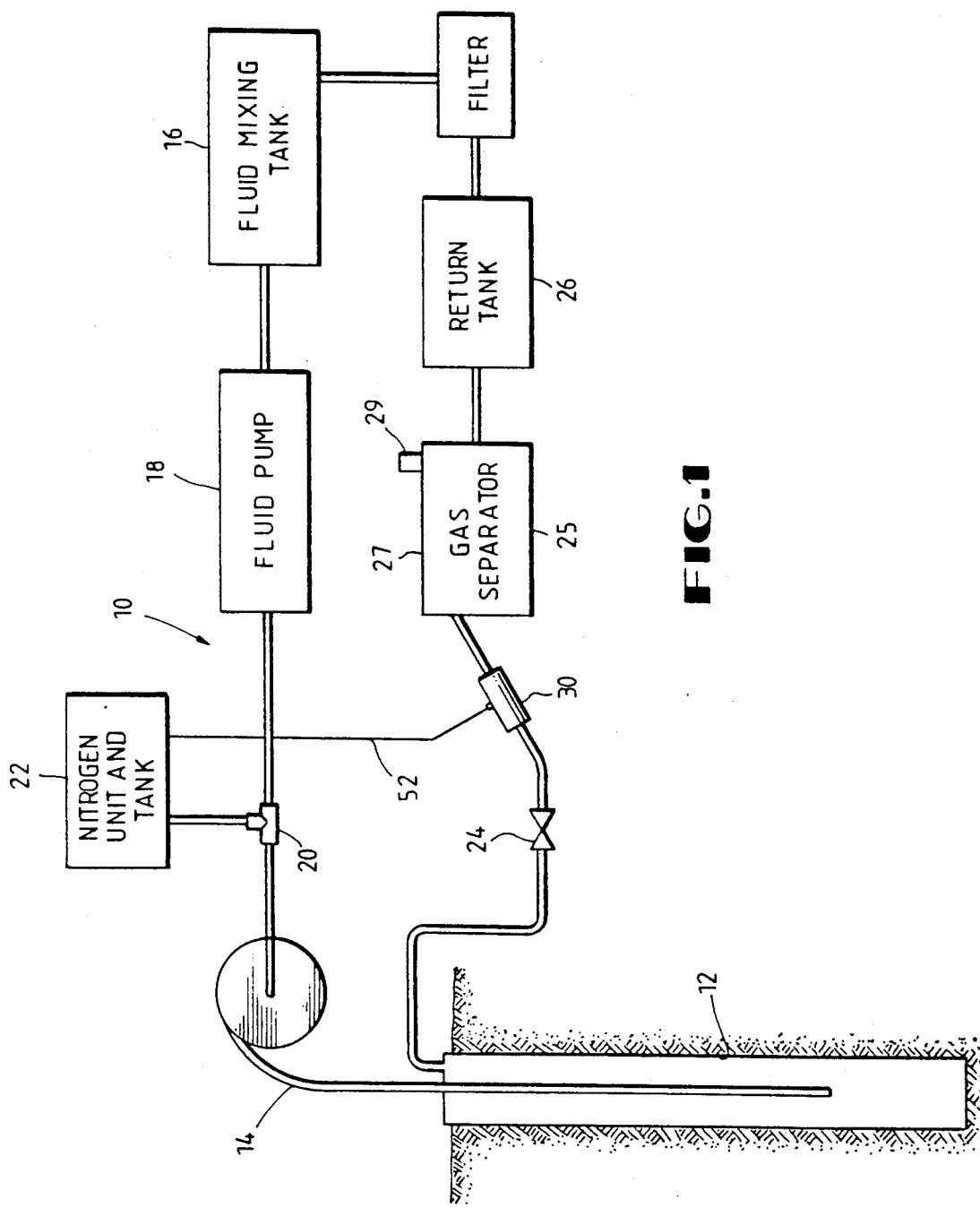
FIG. 1 is an elevational schematic of the equipment layout using the present invention in the process of foam washing of a well for sand removal.

Referring now to the drawings and particularly to FIG. 1, a foam washing system is shown generally indicated by the reference numeral 10 for removing sand from a casing in a well bore 12 by injecting foam through a coiled tubing 14 into the well bore 12.

It is well known to use foam washing as a method of sand removal in wells that have insufficient bottom hole pressure to support a column of fluids. The well bore 12 can be circulated clean with the aid of foam which is a mixture of water, a surfactant and nitrogen. Foam is generated with the aid of an atomizer tee 20 which blends the mixture into a homogeneous compressable fluid with reduced hydrostatic weight and excellent suspension characteristics. Thus, the system 10 includes a fluid mixing tank 16 for mixing water and surfactant which is normally mixed at a ratio of 1 percent surfactant although higher concentrations may be provided depending upon the well bore conditions. The fluid from the tank 16 is pumped by a fluid pump 18 to an atomizing tee 20 which receives nitrogen from a nitrogen supply 22 and mixes the liquid and nitrogen to form extremely small bubbles. These bubbles form a foam which is supplied to a coil tubing 14 which is moved into the casing 12 of the well bore for removing sand therefrom. The returning foam, sand and other well fluids, flow through an adjustable choke 24.

Foam quality (the ratio of nitrogen volume to total volume) may range from 0.5 to 0.93. Stable foam in this quality range can have a gradient from 0.1 to 0.3 psi/ft. Foam is made unstable by disturbing the electrostatic attraction of the molecular film that forms each individual bubble. Each bubble is filled with gas and is stabilized in a range of 50 percent to 93 percent gas by volume. Above this range the molecular chain becomes unstable and gas percentages in the range of 98 percent will break up the structure.

The above-description is generally known. However, the returning foam from the casing 12 will occupy about five times as much space as the fluid that is being removed from the mixing tank 16 to produce the foam. The foam remains stable with a gas content up to 90 percent and requires a long period of time to dissipate back to the volume of the original liquid. Because of size restrictions at the well location, such as offshore rigs, the return tank 26 is not sufficient to hold the returning volume of foam, and the foam cannot be dumped in the environment to cause pollution. The present invention is directed to providing a foam breaker 30 in the return line from the well bore 12 to a conventional gas separator 25 and to the return tank 26. The foam breaker 30 with the Proper mixing of a fluid with the foam returns, at the well surface, causes disintegration of the cells of the foam to reduce the foam to a liquid that can be retained in the return tank 26 and the gas released from the gas separator 25 through exit 29.

Figure 2:
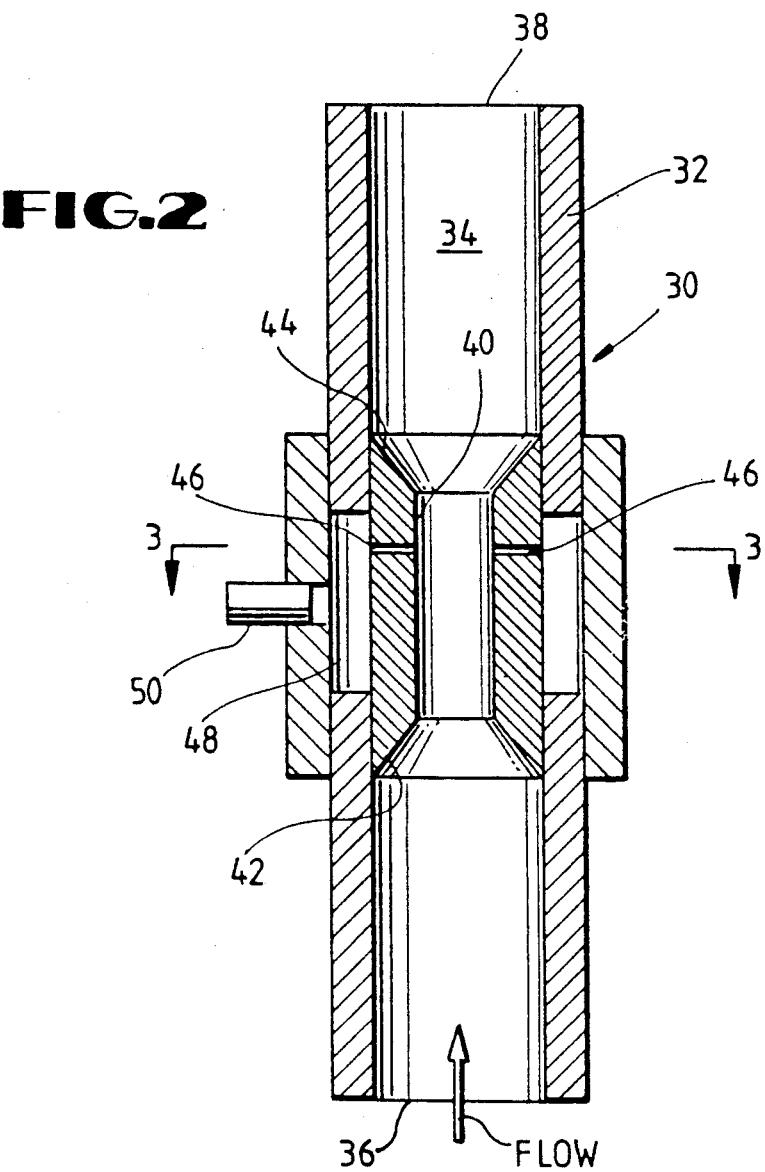
FIG. 2 is an enlarged elevational view, in cross-section, illustrating the foam breaker of the present invention.
Figure 3:
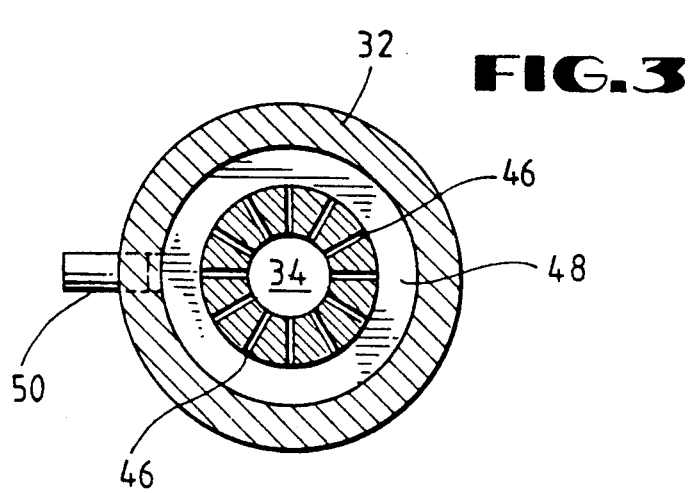
FIG. 3 is a cross-sectional view taken along the line 3—3 of FIG. 2.

Referring now to FIGS. 2 and 3, the foam breaker 30 generally includes a housing 32, having a bore 34 therethrough with an inlet 36 for receiving the foam and an outlet 38 for the exit of the broken up or disintegrated foam.

A restriction 40 is provided in the inside of the housing 32 preferably having tapered ends 42 and 44. Thus the restriction 40 causes the foam to be compressed as it moves into the restriction 40 thereby concentrating the foam. A plurality of jets 46 are circumferentially arranged around the inner periphery of the restriction 40 and are directed into the restricted bore 34. In the preferred embodiment, the jets 46 are arranged in a 360° circle to provide 12 jets at a 30° spacing. Preferably, the jets 46 are nearer the end 44 than the end 42 to act on the compressed foam. A circumferentially extending chamber 48 is provided in the housing 32 and a fluid inlet 50 is connected to the chamber 48 and extends to the outside of the housing 32 for receiving fluid for saturating and breaking up foam flowing through the bore 34.

In the preferred embodiment, the inlet 50 is connected to a line 52 and to the nitrogen supply 22 (FIG. 1) to provide a mixing of nitrogen or other inert gas to increase the percentage of gas in the stable foam to provide a gas percentage in the range of 98% plus which will saturate the foam. Therefore, the foam breaker 30 will provide a uniform mixing of gas with the foam to increase the gas percentage to a level that causes instability and break up of the cell structure. This results in gas and liquid returns to the gas separator 25 where the inert gas is discharged through exit 29. The liquid is transmitted from the separator 25 to the return tank 26 and is almost equal to the original liquid that was used to produce the foam. Thus, the foam breaker 30 compresses the returning foam by restriction or reduction of the bore 34 of the housing 32 and at this point the jets 46 penetrate the foam body with a uniform pattern saturating the total body of foam. Thereafter the saturated foam moves out of the restriction 40 and expands again into the full bore 34 and extends and is unable to hold together and collapses. The liquid in the return tank 26 can then be filtered by filter 54 and returned to the fluid mixing tank 16 for reuse.

If desired, the outlet of the foam breaker 30 is connected to the gas separator 25 and directed at an angle, such as 45°, to the top wall 27 of the separator 25 whereby the impingement of the broken up foam hitting the wall 27 assists in further break out of the foam process.

While the preferred embodiment of the present invention is to destroy the returning foam by an inert gas such as nitrogen, the returning foam can also be broken up and destroyed by injecting water or a suitable stability reducing chemical into the inlet 50 of the foam breaker 30.

That is, foam contains liquid in the space between the surfactant layers. The instant foam is generated, gravity causes drainage of this liquid downward The thinning of the foam from the bottom up is the process of break out. By uniform injection of water into the inlet 50 and through the jets 46 and into the foam body, this process is accelerated. The injection of water causes it to fall by gravity to the lowest point and overcomes the electrostatic attraction of the molecular film that forms each individual bubble. However, the use of water is not as advantageous as of the inert gas as the addition of water to the return tank 26 creates a disposal problem as the water dilutes the returning fluid.

Also, a chemical such as an inorganic salt would counteract the stabilizing mechanics of the anionic surfactants. The molecular chain is constructed by electrostatic repulsion causing the surfactant layer to attract each other. A chemical reducing the electrostatic repulsion allows the fluid to fall out immediately. By inserting such a chemical into the inlet 50 and providing for uniform saturation will provide for a quick break out of the foam. One suitable stability reducing chemical is that sold by Exxon under the trademark "Tek Mud 1926." However, again, the use of a chemical to break up the returning foam, while conserving space in the return tank 26, is not as advantageous as using nitrogen, as the use of such a chemical prevents reuse of the liquid in the return tank.

The present invention, therefore, is well adapted to carry out the objects and attain the ends and advantages mentioned as well as others inherent therein. While a presently preferred embodiment of the invention has been given for the purpose of disclosure, numerous changes in the details of construction, and steps of the process will be readily apparent to those skilled in the art and which are encompassed within the spirit of the invention and the scope of the appended claims.

What is claimed is:

1. In the method of treating an oil and/or gas well with a foam mixture of liquid and gas in which the foam is injected into the well bore and is then returned from the well bore, the improvement in a method of breaking up the mixture for storage comprising, receiving the foam from the well bore, compressing the foam mixture, saturating the compressed foam mixture with a fluid by injecting a fluid into the compressed foam mixture, and expanding the saturated foam mixture for separation into a liquid and gas, and separating the liquid and gas.

2. The method of claim 1 wherein the fluid is an inert gas.

3. The method of claim 1 wherein the gas is nitrogen.

4. The method of claim 1 wherein the fluid is water.

5. The method of claim 1 wherein the fluid is a stability reducing chemical.

6. The method of claim 1 including reusing the liquid for preparing additional foam.

7. An apparatus for breaking up a mixture of gas and liquid forming a foam comprising,
a housing having a bore for receiving the foam,
a restriction in the bore for compressing the foam,
a plurality of jets circumferentially positioned around and directed into the restriction, and
fluid conducting means connected to each of the jets and extending to the outside of the housing for receiving fluid for breaking up foam flowing through the bore.

8. The apparatus of claim 7 wherein said jets are positioned around the inner periphery of the restriction and adjacent the downstream end of the restriction.

9. The apparatus of claim 7 wherein the fluid conducting means includes a circumferentially extending chamber in the housing.

10. The apparatus of claim 7 wherein the housing includes an inlet and outlet, and including,
a gas separator, said separator having a wall connected to the outlet, and the longitudinal axis of the housing directed at an angle to the wall.

11. In a foam washing system for removing solid particles from the well bore of an oil and/or gas well having a fluid mixing tank, a fluid pump, a nitrogen supply, an atomizing tee, and a coil tubing extending into the well bore for inserting foam into the well bore, the improvement in means for breaking up foam including,
a foam breaker connected to the well bore for receiving returning foam, said foam breaker including a housing having a bore for receiving foam, a restriction in the bore for compressing the foam, a plurality of jets circumferentially positioned around and directed into the restriction,
a gas supply connected to the jets for saturating and breaking the compressed foam in the restriction,
a gas separator connected to the outlet of the foam breaker for receiving the broken up foam and separating the liquid and gas, and
a return tank connected to the separator for receiving the liquid.

12. The apparatus of claim 11 including,
a filter connected to the return tank and a line between the filter and the fluid mixing tank.

* * * * *

UNITED STATES PATENT OFFICE
CERTIFICATE OF CORRECTION

Patent No. 5,015,273                    Dated May 14, 1991

Inventor(s) Billy E. Hamilton et al.

It is certified that error appears in the above-identified patent and that said Letters Patent is hereby corrected as shown below:

Column 3, line 19, delete "Proper" and insert -- proper --

Column 4, line 15, after "downward" insert -- . --

Column 6, line 26, after "tank" insert -- for reusing the liquid from the return tank"

Signed and Sealed this

First Day of December, 1992

Attest:

DOUGLAS B. COMER

Attesting Officer        Acting Commissioner of Patents and Trademarks